United States Patent
Mohebbi

(10) Patent No.: US 8,081,585 B2
(45) Date of Patent: Dec. 20, 2011

(54) MULTI-HOP BOOSTER

(75) Inventor: Behzad B. Mohebbi, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 1009 days.

(21) Appl. No.: 12/015,469

(22) Filed: Jan. 16, 2008

(65) Prior Publication Data

US 2008/0205261 A1   Aug. 28, 2008

Related U.S. Application Data

(60) Provisional application No. 60/885,195, filed on Jan. 16, 2007.

(51) Int. Cl.
*H04B 7/14* (2006.01)
(52) U.S. Cl. ......................... 370/279; 370/315
(58) Field of Classification Search ......................... None
See application file for complete search history.

(56) References Cited

U.S. PATENT DOCUMENTS

| | | | | |
|---|---|---|---|---|
| 5,848,097 A | * | 12/1998 | Carney et al. | 375/219 |
| 5,867,490 A | * | 2/1999 | Campanella | 370/326 |
| 6,484,012 B1 | | 11/2002 | Nche et al. | |
| 2001/0031646 A1 | * | 10/2001 | Williams | 455/560 |
| 2003/0058950 A1 | | 3/2003 | McCoy | |
| 2006/0105705 A1 | * | 5/2006 | Maca et al. | 455/11.1 |
| 2007/0211669 A1 | * | 9/2007 | Umatt et al. | 370/335 |

FOREIGN PATENT DOCUMENTS

WO    WO 2005/069249 A    8/2005

OTHER PUBLICATIONS

International Search Report for related patent PCT/US2008/051228 performed by International Searching Authority/EP on Jun. 17, 2008.
Written Opinion of International Searching Authority for related patent PCT/US2008/051228 performed by International Searching Authority/EP on Jun. 17, 2008.

* cited by examiner

*Primary Examiner* — Daniel J Ryman
*Assistant Examiner* — Tito Pham
(74) *Attorney, Agent, or Firm* — Mintz Levin Cohn Ferris Glovsky and Popeo, P.C.

(57) ABSTRACT

A two-way wireless repeater and booster system and method are disclosed. The system and method improve signal quality and strength for the middle hop of a three-hop repeater, between User and Network Units operating in the unlicensed bands (ISM and/or UNII), and supporting the cellular (or wireless) network communications channels. The system and method enables the support of a wider repeat spectrum or bandwidth for a given communications bandwidth in the unlicensed band.

6 Claims, 5 Drawing Sheets

MULTI-HOP BOOSTER

CROSS REFERENCE TO RELATED APPLICATION

The present patent application claims priority under 35 U.S.C. §119 to U.S. Provisional Patent Application Ser. No. 60/885,195, filed on Jan. 16, 2007, and entitled, "Multi-Hop Booster", the entire disclosure of which is incorporated by reference herein.

BACKGROUND

This document describes a novel two-way wireless repeater and booster.

Most 3G and so called 4G systems (4G systems are mostly based on Orthogonal Frequency Division Multiplexing (OFDM) modulation) support high data rates, and as such have communication channels much larger in bandwidth (BW) compared to the 2G systems such as GSM. For example, a Wideband Code Division Multiple Access (WCDMA) channel at 5 MHz is 25 times larger than the GSM 200 kHz, while a WiMax channel BW is larger by 50 times or more.

While the aforementioned operation is true about a single communication channel, the Global System for Mobile (GSM) Frequency Hopping (FH) feature enables a GSM device to hop the full allocated spectrum, meaning a single GSM channel will, in the course of a session, operate on much broader BW than a static WCDMA or WiMax channel. This effectively means that a repeater or booster device, that does not have the capability of following the FH algorithm, has to "pass through" the entire spectrum in which the GSM communication channel is allowed to hop over, which is often the entire allocated spectrum to a given operator.

Further, the GSM allocated spectrum for a given operator may or may not be contiguous. Also it is desirable for a repeater and booster device to operate only on an "intended" network provider licensed frequencies, avoiding any operation in channels that are outside the licensed spectrum of the "intended" operator. This requirement means that a repeater (or booster) has to be designed to operate ONLY with a set of specific channels that may or may not be contiguous. FIG. 2 illustrates an example of such a scenario, where a given operator in a given area has three 10 MHz non-contiguous bands, totaling 30 MHz (15 MHz uplink and 15 MHz downlink), and where a GSM derived network can frequency hop on any 75 available channels. Ideally, the repeater shown in FIG. 2 will select, boost and repeat only the channels of interest, as shown.

Further still, since the repeated spectrum is now 15 MHz in a given direction, a digital link between the Network and the User units will require much larger operating BW (15×2×2× 10=600 Mbs/s one way) which, although possible, may not be practical for a small consumer device. It may also be difficult to meet spectral regulations and regulatory requirements such as Dynamic Frequency Selection (DFS) and spectral emission mask in the unlicensed band, if large portions of the spectrum are concurrently used. Therefore, an OFDM based link (or any other digitally modulated link) may not be the most appropriate solution for the middle hop between the Network and the User units.

SUMMARY

This document discloses a novel two-way communications system and method for the middle hop (hop2 in FIG. 1), between User and Network Units (FIG. 1) operating in the unlicensed bands (ISM and/or UNII), and supporting the cellular (or wireless) network communications channels. The system and method enables the support of a wider repeat spectrum (bandwidth) for a given communications bandwidth in the unlicensed band (hop2 in FIG. 1). Also, channel and spectrum select algorithms are disclosed that enable a "network friendly" operation of the booster, which means the booster will not operate and will not repeat other third party network frequencies. This effectively eliminates any unintentional harm caused by the repeater operation in other third party networks. Finally, control and data communications channels and mechanisms are defined for the repeater that allows messages at every protocol layer (including the physical and MAC layers) to be exchanged between the Repeater (Booster) and the operating network.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The following description is based on a GSM-derivative network of North America operating at PCS bands. With minor modifications, the following described systems and techniques can be applied to GSM/GPRS/EDGE, cdma2000, WCDMA, WiMax and any other cellular and/or wireless communication systems. Patent applications WO2005025078, filed Sep. 3, 2003 and WO2005069249, filed Jan. 12, 2004, by Mohebbi, both entitled "Short-Range Booster" and the contents of which are incorporated by reference herein for all purposes, describe a three-hop short range booster or repeater.

Figure 3:
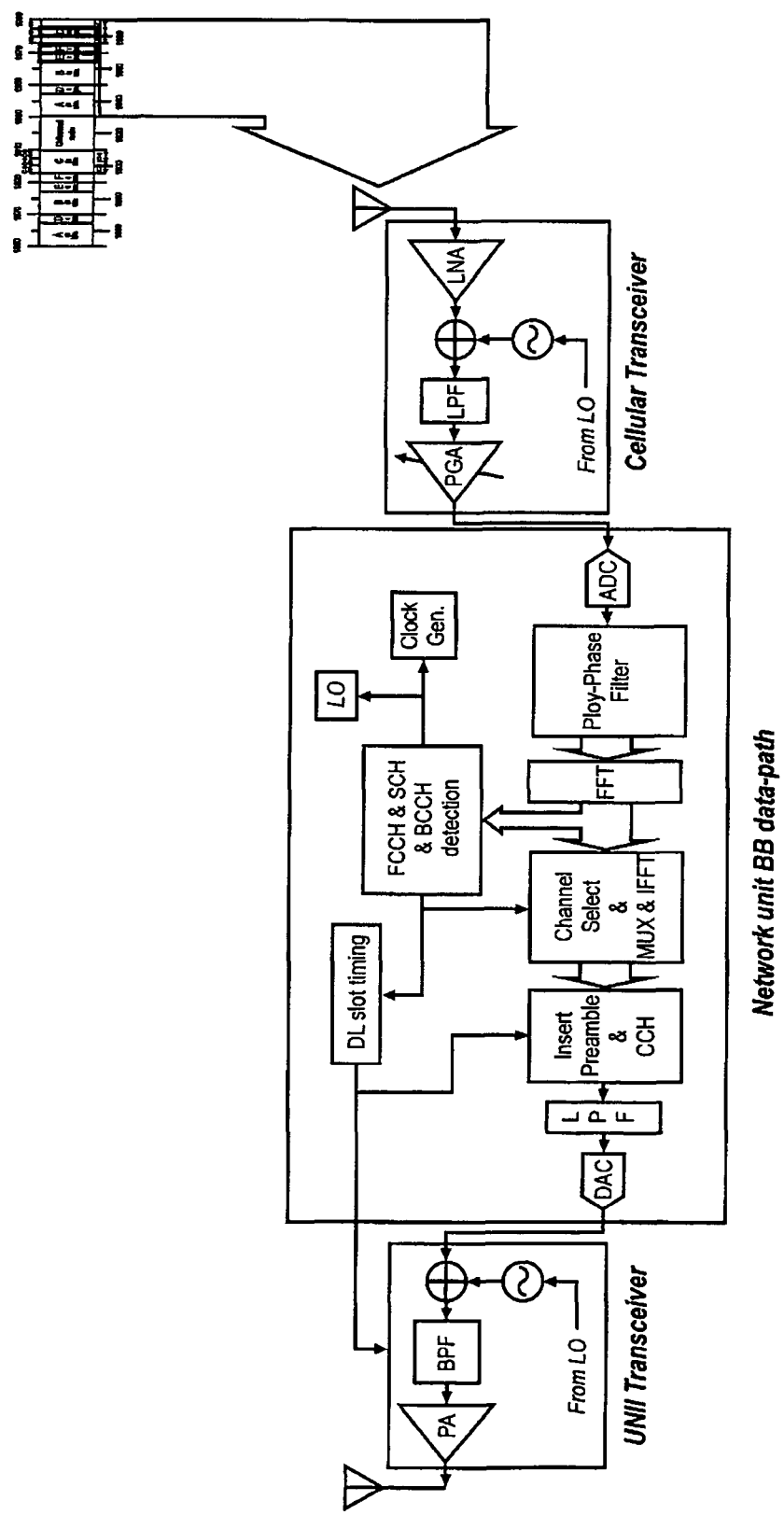
FIG. 3 shows a Network unit downlink datapath.
Figure 5:
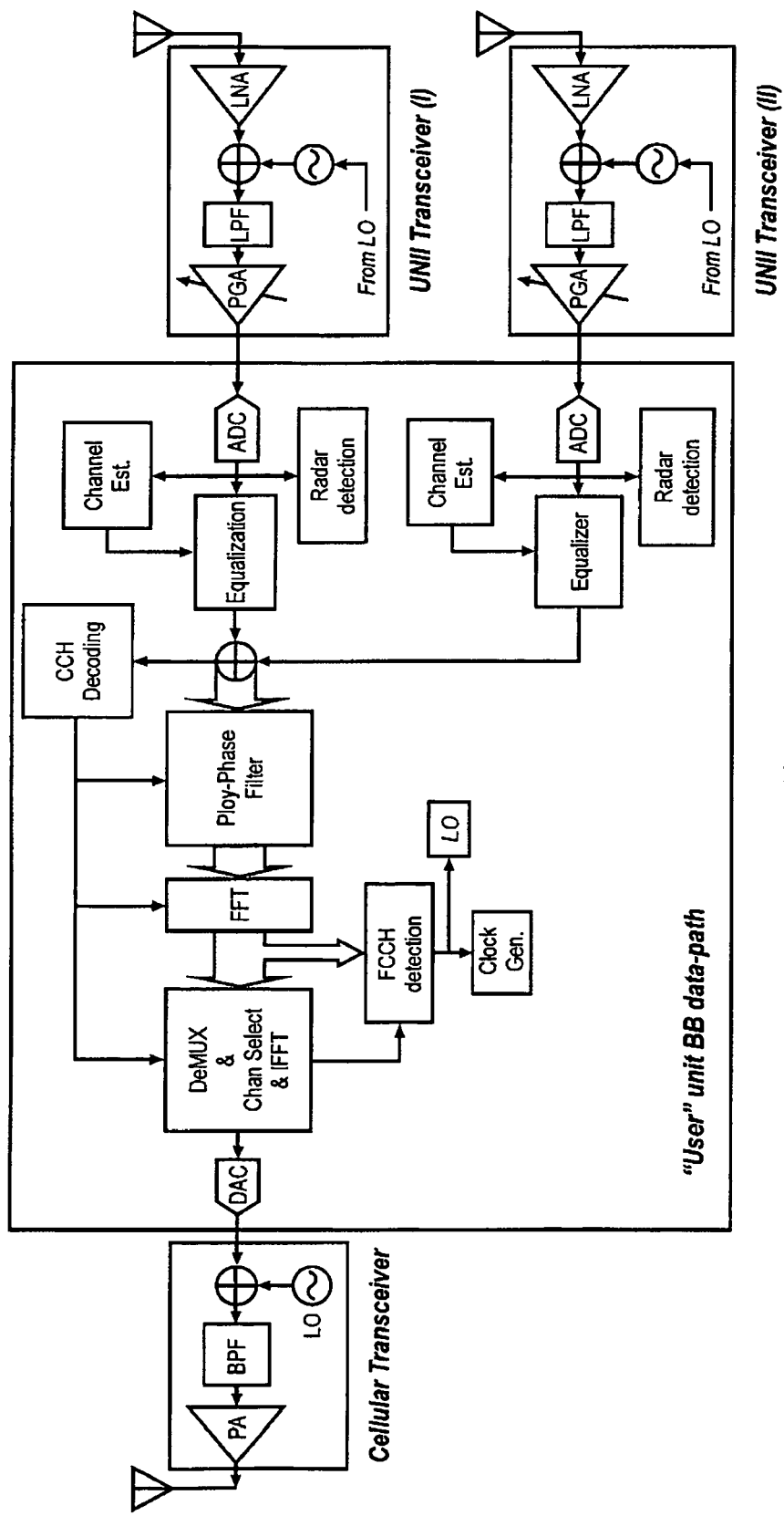
FIG. 5 shows a downlink datapath of the User unit.

FIG. 3 is a block diagram showing a downlink datapath 300 for the Network unit. The datapath is a complex format. A related complex downlink datapath for the User unit is shown in FIG. 5. In the downlink datapath 300, the repeater (Booster) down-converts (in the RF FE) the entire downlink spectrum of the allocated PCS bands, and digitizes it with an analog-to-digital converter (ADC) 302. It is also possible to down-convert and digitize a continuous portion of the PCS spectrum, over which the system for a given operator is expected to frequency hop. In some cases, it may be more practical to use several RF transceivers in parallel, to cover the blocks of interest of the spectrum.

Figure 1:
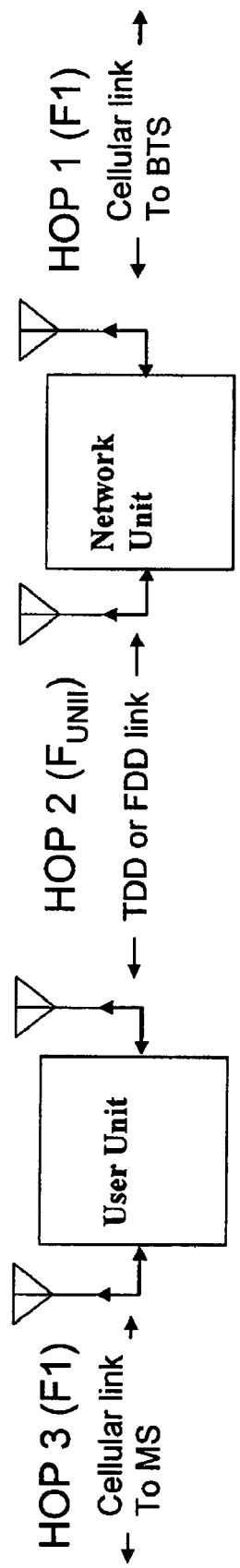
FIG. 1 shows a three-hop booster system.
Figure 2:
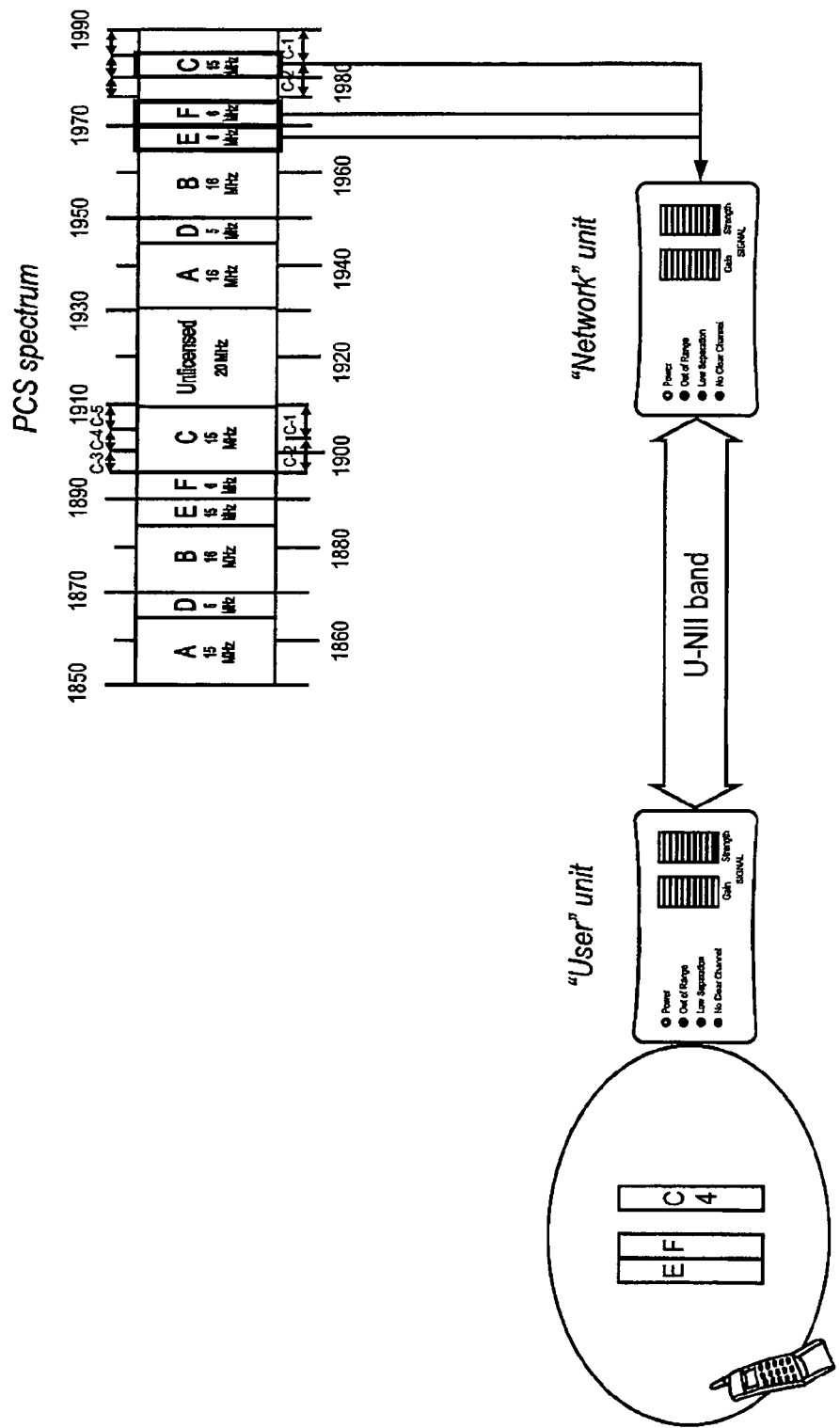
FIG. 2 illustrates new repeater or booster requirements.

Referring back to FIG. 2, only E, F and C-4 blocks of PCS spectrum are of interest with all other blocks to be avoided in the booster datapath. In order to select the bands of interest, while blocking the other channels, a 200 kHz channelizing filter, preferably a poly-phase filter 304 followed by an FFT block 306, can be connected to the ADC 302. At the output of the FFT block 306, depending on the original spectrum BW, there will be a number of 200 KHz channels. For example if only E, F and C blocks are digitized (i.e. 25 MHz), there will be 125 channels, in which only 75 should be selected and passed through to the User unit. While channelization of the spectrum and the channel selection can also be made at the User unit, it is preferable that these tasks be performed at the Network unit as it also reduces the signal BW from 125 channels to 75 channels, reducing the BW requirement of the UNII channel.

After channelization of the spectrum, the average received signal strength indicator (RSSI) of each channel (frequency control channel (FCCH), synchronization control channel (SCH), and broadcast control channel (BCCH)) is measured and recorded at an "FCC & SCH & BCCH detection" module 308, and based on these RSSI readings, the strongest possible BCCH carrier from the selected channels is identified. After selection of the strongest channel, the FCCH is used to output the reference frequency to a "Clock Generator" module 310, and a local oscillator (LO) 312, where the generated reference frequency is used to correct the local oscillator frequency errors, locking the LO 312 and clocks to the BTS frequency reference.

After this operation, the Synch channel (SCH) is detected and BCCH messages decoded to extract the Mobile Network Code (MNC) and Location Area Identification (LAI) along with other system broadcast information. If the decoded MNC belongs to the desired PLMN, the LAI is used to determine the list of the active channels (75 in this example), in the given area, that have to be supported by the repeater (booster). The list of desired channels is passed to a "Channel Select & MUX" module 314, which selects the channels and modulates them next to each other on carriers that are 200 kHz apart, while increasing the sampling rate and supporting the 15 MHz total BW. The order of the channels as they arrive should be followed, as frequency planning is used to avoid adjacent channels in the same cell, such that the adjacent channels does not interfere with each other.

On the discontinuous spectrum boundary, if two strong channels happen to end up next to each other, the channel assignment order has to be changed by a channel with low RSSI, or a "dummy" channel needs to be inserted between the two strong channels. Care should also be taken to make sure the final waveform does not violate the spectral emission mask of the UNII band. The waveform at this point will contain, at least, all the (75) GSM channels, even though the waveform is different from that of the downlink signal entering the cellular RF FE. In the original signal transmitted from the BTS (and the MS on the uplink), there are power-ramping gaps of 8¼ symbol duration (~30 μsec), where no information is transmitted.

The time-slot (TS) boundary and hence the start of the gaps can be detected by the TS timing extracted from the SCH and used for two purposes:

1) Insertion of the preamble and control channel symbols—This task is performed by an "Insert preamble & CCH" module 316. The preamble can be similar to 802.11a long-symbols of the preamble, although one, two or more symbols can be used. The CCH symbol can also be similar to the 802.11a OFDM symbol, carrying the system information from the Network to User unit. Note that a similar link exists in the uplink between the User and Network units.

2) Switching UNII band transceivers from Tx to Rx and vice versa—This operation is required for radar detection and is performed by transmitting on a UNII channel for a short period (1.154 msec, for example), before switching the transmissions to a second channel for the next transmit period (1.154 msec, for example), and switching the transceiver on the first channel to the Rx mode, receiving the reverse-link transmissions and detecting radar pulses. In the absence of the uplink transmissions, the transceiver switching is based on the downlink TS boundary. However, as soon as the MS commences transmissions on the uplink, the TS transmission times are established and used to move the switching time so as to avoid switching during any uplink time slots, but keeping the switching at one of the downlink slot boundaries.

A low pass filter (LPF) 318 prior to a Digital-to-analog converter (DAC) 320 ensures the spectral transmission mask for UNII band is met, no matter what the composite analogue waveform spectral shape is. To a large extent, the effect of the LPF 318 can be equalized on the receiver side shown in FIG. 5.

Figure 4:
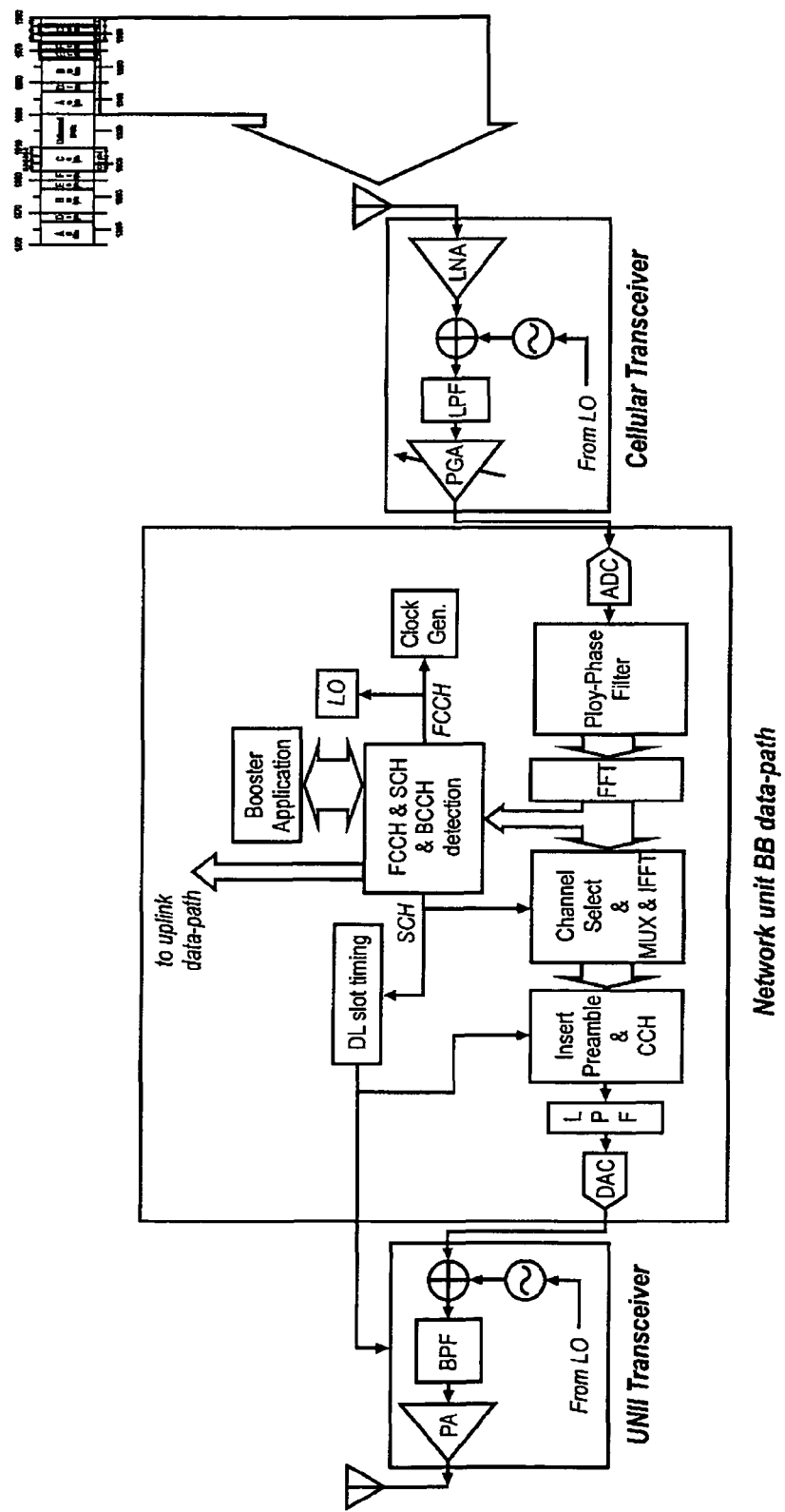
FIG. 4 shows an alternative Network unit downlink datapath.

An alternative implementation of a Network unit downlink datapath is shown in FIG. 4. In this implementation, instead of the "FCC & SCH & BCCH detection" module 308 of FIG. 3, which is a subset of the GSM baseband (BB) algorithms, a full GSM handset BB module 408, along with the MAC, is used, enabling the Network unit to decode Traffic (TCH) and other systems channels, as well as all the previously mentioned channels. The decoding of these additional channels enable Network unit to receive "dedicated" messages from the network. Further, the inclusion of the "GSM BB & MAC" module 408, along with a "Booster Application" module 410, enables the Network unit to set up a dedicated two-way communications link with the PLMN network, exchanging control and information (as well as physical layer messages) between the repeater (booster) and the network. These messages can belong to any of the layers, from application to physical layers.

The downlink datapath of the User unit is shown in FIG. 5. As the fading mitigation in the second hop is essential for an acceptable performance, the User unit UNII channel receiver would preferably have, at least a two-branch antenna diversity scheme such as Maximal Ratio Combining (MRC), even though it is possible to operate with a single branch receiver (No diversity), if the Rx SNR is sufficiently high.

The ADC 506 connected to each transceiver is in turn connected to three modules, a Radar Detection module 508, a Channel Estimation module 510, and an equalizer 512. The Radar Detection module 508 executes a radar detection algorithm to detect radar pulses. This algorithm can be based on simple RSSI, and the desired threshold, as the GSM requires a minimum 9 dB SNR to be maintained throughout the link. Closed-loop power control may be used to maintain the required SNR of the GSM channels in the UNII band, enabling radar detection.

Since the signal is in a time-dispersive channel, it is important to use the channel equalizer 512 on each branch of the receiver, before any diversity combining. The preamble transmitted at the beginning of each new transmit epoch is used for the training of the equalizer. This preamble is extracted by the Channel Estimation module 510. If the length of a given preamble is not sufficient, it is possible to use the preamble history, from previous stored transmit epochs, to obtain a larger preamble. It is also possible to use a long preamble at the beginning of the operation to converge to a set of equalizer weights, and thereafter using the shorter on-going preambles, track and converge for the small weight changes experienced in the short time between each transmission epoch. Further, as each GSM TS is around 577 gsec, provided that the transmit duration is more than several TS, it is possible that in one transmit epoch (say 11.54 msec), several (say 10) preambles be transmitted. The channel equalizer 512 can be based on simple Zero-Forcing algorithm, or for better noise performance in low SNR, a Minimum Mean Square Error (MMSE) algorithm can be used. Other equalization techniques can also be used. The equalizer 512 removes time dispersion, improving SNR and corrects the phase of each branch for the coherent combining.

After the coherent combining, a Control Channel (CCH) decoder 514 decodes the control channel, and the messages are used to configure a poly-phase filter 516, an FFT module 518, and a "DeMux & Channel Select" module 520. The task of these modules are to channelize the incoming signal into 200 Mhz channels, change the sampling rate and demodulate the incoming channels to their original location and finally increase the sampling rate to support the new signal BW. The same FCCH channel that was used in the Network unit to extract the reference frequency signal can be used in the User unit to extract the reference frequency, as detected by FCCH detection module 522. Otherwise, the preamble and/or the CCH can be used to frequency lock the two Network and User units. The time synchronization for switching the UNII transceivers—can also be based on the Preamble and/or the CCH symbol timing, and/or similar SCH detection block (not shown in FIG. 5). The output waveform is sent to a cellular transceiver for transmission via a DAC.

The uplink datapath will be similar to the downlink datapath, except for the following differences. In the User unit there is no need for "FCC & SCH & BCCH detection" module. Instead a RSSI estimation block is used to find the level and the timing of the uplink transmissions. The timing and RSSI level information are sent to the Network unit for the selection of the best switching time on the UNII link. In the Network unit there is no need for the "FCCH detection" module as both units are fully synchronized to the BTS by the virtue of the downlink datapath.

Although a few embodiments have been described in detail above, other modifications are possible. Other embodiments may be within the scope of the following claims.

What is claimed is:

1. A multi-hop booster system comprising:
a network unit communicating with a wireless base transceiver and a user unit communicating between the network unit and a user device, the network unit comprising:
an analog-to-digital converter to digitize radio frequency signals from the wireless base transceiver;
a polyphase filter for filtering the digitized radio frequency signals from the analog-to-digital converter;
a fast fourier transform processor for performing a Fast Fourier Transform (FFT) operation on the filtered, digitized radio frequency signals;
a channel selection and multiplexing processor for channelizing and multiplexing the output of the fast fourier transform processor; and
a digital-to-analog converter to convert the digitized radio frequency signals into analog output signals on one or more channels; and
the user unit comprising, for each of the one or more channels:
an analog-to-digital converter to digitize the analog output signals from the network unit;
a channel estimator for estimating a selected channel of the one or more channels on which the analog output signals are received; and
an equalizer to equalize any time dispersal on the selected channel; and
the user unit further comprising:
a coherent combiner to combine outputs of the equalizers;
a polyphase filter for filtering the combined outputs of the equalizers;
a fast fourier transform processor for performing an FFT operation on the filtered, combined outputs of the equalizers;
a channel selection and demultiplexing processor for channelizing and demultiplexing the filtered, combined outputs of the equalizers; and
an analog-to-digital converter to digitize the filtered, combined outputs of the equalizers to produce a boosted output signal for the user device.

2. The multi-hop booster system in accordance with claim 1, wherein the network unit further comprises a media access control (MAC) processor to establish a dedicated two-way communications network with the user unit.

3. The multi-hop booster system in accordance with claim 1, wherein the analog output signal is in the UNII band of wireless signals.

4. The multi-hop booster system in accordance with claim 1, further comprising a preamble and control channel insertion processor for inserting a preamble and control channel into the channelized and multiplexed output of the fast fourier transform module.

5. The multi-hop booster system in accordance with claim 1, further comprising a frequency correction channel (FCCH), synchronization channel (SCH), and broadcast control channel (BCCH) detection processor for detecting and selecting, from the channelized output of the fast fourier transform processor, at least one of each of a FCCH, an SCH, and a BCCH.

6. The wireless repeater in accordance with claim 5, wherein the FCCH, SCH, and BCCH detection processor selects the strongest BCCH carrier signal from the selected control channels.

* * * * *